United States Patent
Ganjvar et al.

(10) Patent No.: US 12,030,028 B2
(45) Date of Patent: Jul. 9, 2024

(54) CORRUGATED GRID SUPPORT FOR VERTICAL BOILING REACTOR

(71) Applicant: Scientific Design Company, Inc., Little Ferry, NJ (US)

(72) Inventors: Mohammad Ganjvar, Mahwah, NJ (US); Jiacheng Ni, Ridgewood, NJ (US)

(73) Assignee: Scientific Design Company, Inc., Little Ferry, NJ (US)

( * ) Notice: Subject to any disclaimer, the term of this patent is extended or adjusted under 35 U.S.C. 154(b) by 44 days.

(21) Appl. No.: 17/564,658

(22) Filed: Dec. 29, 2021

(65) Prior Publication Data
US 2022/0203322 A1    Jun. 30, 2022

Related U.S. Application Data

(60) Provisional application No. 63/132,262, filed on Dec. 30, 2020.

(51) Int. Cl.
*B01J 19/00* (2006.01)
*F28D 7/10* (2006.01)

(52) U.S. Cl.
CPC ......... *B01J 19/0013* (2013.01); *B01J 19/006* (2013.01); *F28D 7/10* (2013.01);
(Continued)

(58) Field of Classification Search
CPC ......... B01J 8/00; B01J 8/02; B01J 8/06; B01J 8/067; B01J 19/00; B01J 19/0006; B01J 19/0013; B01J 19/0053; B01J 19/006; B01J 19/24; B01J 2208/00; B01J 2208/00008; B01J 2208/00017; B01J 2208/00106; B01J 2208/00168; B01J 2208/00212; B01J 2208/00221; B01J 2208/00238;
(Continued)

(56) References Cited

U.S. PATENT DOCUMENTS 3,563,914 A    2/1971    Wattimena
3,566,961 A *  3/1971    Lorenz ............. B01J 8/062
                                                   165/104.31
(Continued)

FOREIGN PATENT DOCUMENTS

EP    0105938 A1    4/1984
WO    02063230 A1   8/2002

OTHER PUBLICATIONS

International Search Report dated Mar. 22, 2022, received in a corresponding foreign application, 8 pages.

*Primary Examiner* — Natasha E Young
(74) *Attorney, Agent, or Firm* — Scully, Scott, Murphy & Presser, P.C.

(57) ABSTRACT

A baffle (i.e., tube support) for use in a shell-and-tube heat exchange reactor, such as, for example, an ethylene oxide (EO) reactor, is provided that accommodates reduced tube pitch, and thus more catalyst packed tubes can be inside the reactor. The baffle, which can be referred to herein as a corrugated grid support, includes a plurality of corrugated stainless steel strips which sit into each other and form a grid pattern having tube openings. Each tube opening is configured to permit a catalyst packed tube to be inserted therein, while allowing a sufficient open area along the shell side of the tube to permit coolant to flow through the reactor.

18 Claims, 6 Drawing Sheets

(52) U.S. Cl.
CPC ............... *B01J 2219/00081* (2013.01); *B01J 2219/00763* (2013.01)

(58) Field of Classification Search
CPC ............... B01J 2208/06; B01J 2219/00; B01J 2219/00049; B01J 2219/00051; B01J 2219/00074; B01J 2219/00076; B01J 2219/00081; B01J 2219/00761; B01J 2219/00763; F28D 7/00; F28D 7/10; F28D 7/16; F28F 9/00; F28F 9/007; F28F 9/013; F28F 9/0131; F28F 9/0135; F28F 21/00; F28F 21/08; F28F 21/081; F28F 21/082; F28F 21/083
See application file for complete search history.

(56) References Cited

U.S. PATENT DOCUMENTS

| | | | |
|---|---|---|---|
| 3,702,259 A | 11/1972 | Nielsen | |
| 4,384,697 A | 5/1983 | Ruhe | |
| 4,595,161 A * | 6/1986 | Williams | F28F 9/0136 248/68.1 |
| 4,761,394 A | 8/1988 | Lauritzen | |
| 4,766,105 A | 8/1988 | Lauritzen | |
| 4,908,343 A | 3/1990 | Bhasin | |
| 5,011,807 A | 4/1991 | Hayden et al. | |
| 5,057,481 A | 10/1991 | Bhasin | |
| 5,099,041 A | 3/1992 | Hayden et al. | |
| 5,102,848 A | 4/1992 | Soo et al. | |
| 5,187,140 A | 2/1993 | Thorsteinson et al. | |
| 5,407,888 A | 4/1995 | Herzog et al. | |
| 7,294,317 B2 * | 11/2007 | Billig | F28D 7/16 422/198 |
| 2007/0037991 A1 | 2/2007 | Rizkalla | |
| 2014/0262171 A1 * | 9/2014 | Ljubicic | B21D 53/06 29/890.03 |

* cited by examiner

CORRUGATED GRID SUPPORT FOR VERTICAL BOILING REACTOR

CROSS REFERENCE TO RELATED APPLICATION

The present invention claims benefit of U.S. Provisional Application Ser. No. 63/132,262, filed Dec. 30, 2020, the entire content and disclosure of which is incorporated herein by reference.

FIELD OF THE INVENTION

The present invention relates to a vertical boiling reactor, and more particularly to a shell-and-tube heat exchange reactor having reduced tube pitch

BACKGROUND

Ethylene oxide (EO) is an important industrial chemical used as a feedstock for making various chemicals, such as, for example, ethylene glycol, ethylene glycol ethers, ethanol amines and detergents. One method for producing EO is by a catalytic oxidation process in which ethylene is reacted with oxygen in the presence of a silver-based epoxidation catalyst. In such a process, a feedstream containing ethylene and oxygen is passed over a bed of the silver-based epoxidation catalyst contained within a reaction zone of an EO reactor that is maintained at certain reaction conditions.

Figure 1:
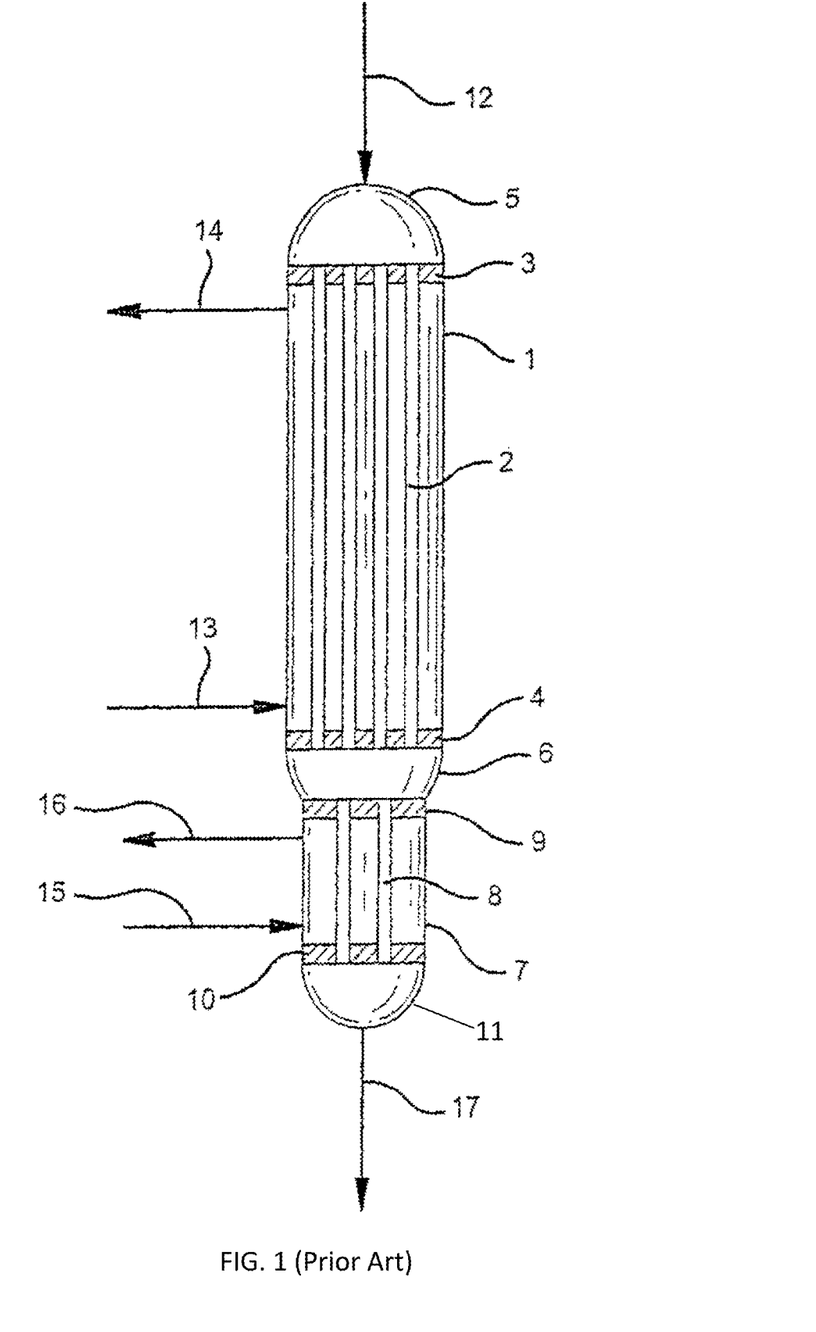
FIG. 1 is schematic representation of a prior art EO reactor.

Commercial EO reactors are generally in the form of a shell-and-tube heat exchanger, in which a plurality of substantially parallel elongated, relatively narrow tubes are filled with catalyst particles to form a packed bed, and in which the shell contains a coolant. One such EO reactor is shown in FIG. 1. The EO reactor 1 shown in FIG. 1 includes a plurality of elongated tubes 2 in which an inlet end of each of the elongated tubes 2 is affixed to inlet tube sheet 3 and the outlet end of each of the elongated tubes 2 is affixed to outlet tube sheet 4. An inlet reactor head 5 is provided as is an exit reactor head 6.

EO reactor 1 further includes a shell and tube heat exchanger 7 that is affixed to and is integral with the exit head 6. An opening is provided in the exit head 6 for communication with heat exchanger 7, and the heat exchanger 7 is welded to the exit head 6 around the opening thus forming an integral structure with the reactor. Heat exchanger 7 is provided with tubes 8 which are affixed to tube sheets 9 and 10. Heat exchanger exit head 11 is also provided.

In practice, reaction gases, e.g., ethylene, oxygen and ballast gas are introduced into the EO reactor 1 via line 12 and pass at reaction conditions through tubes 2 which are packed with an appropriate silver-based epoxidation catalyst. Heat of reaction is removed by circulating heat transfer fluids such as water which are introduced via line 13 to the shell side of the EO reactor 1 and removed via line 14.

Reaction gases pass through tubes 2 where production of EO takes place and upon exiting tubes 2 the gases pass to exit head 6 and then to tubes 8 of the heat exchanger 7 and are immediately cooled to prevent further oxidation and isomerization. A cooling fluid, such as, for example, water, is introduced to the shell side heat exchanger 7 via line 15 and removed via line 16. Cooled reaction gases exit heat exchanger 7 via line 17 and are treated in a conventional fashion for recovery of product and recycle of various components.

Baffles (i.e., tube supports) are well known components of a shell-and-tube heat exchange reactor including the EO reactor mentioned above. Generally, baffles are perforated plates which are located inside the shell side of the heat exchanger supporting the entire length of the catalyst packed tubes against movement/vibration and diverting flow to increase heat transfer.

Figure 2A:
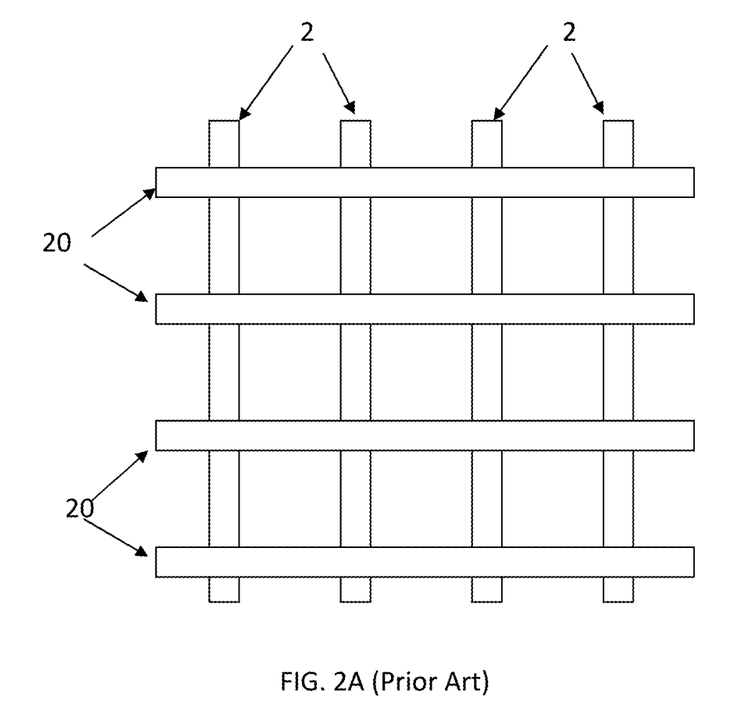
FIG. 2A is a schematic representation through an enlarged cross sectional view of a portion of EO reactor shown in FIG. 1 containing baffles (i.e., tube supports) for supporting a plurality of elongated tubes.
Figure 2B:
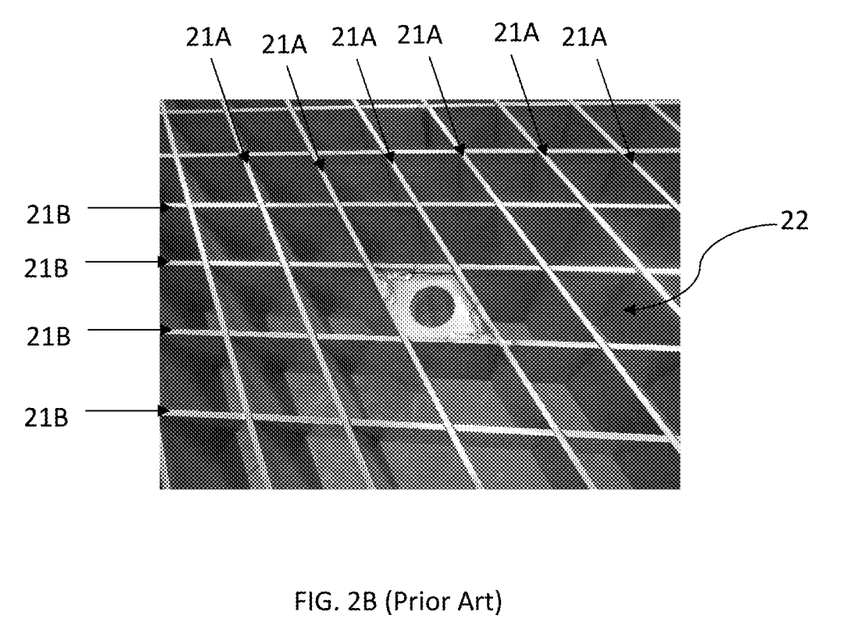
FIG. 2B is a pictorial representation of a prior art baffle (i.e., tube support) which includes stainless steel straight strips which sit into each other and form a grid pattern.

FIG. 2A, which is an enlarged cross sectional view of the EO reactor shown in FIG. 1 and between the inlet tube sheet 3 and the outlet tube sheet 4, illustrates a plurality of vertically spaced apart baffles (i.e., tube supports) 20 for supporting each of the elongated tubes 2. In some instances, the baffles 20 include stainless steel straight strips 21A, 21B which sit into each other and form a grid pattern as shown in FIG. 2B; each of the prior art stainless steel strips that provide the baffle shown in FIG. 2B has straight edges along the entire length of the strip. As is shown in FIG. 2B, stainless steel straight strips 21A are orientated parallel to each other and run in a first direction, while stainless steel straight strips 21B are orientated parallel to each other and run in a second direction that is different from the first direction of stainless steel straight strips 21A. Each of strainless steel straight strips 21B intersects each of strainless steel straight strips 21A so as to form a grid pattern that contains tube openings 22. Each tube opening 22 has a dimension in which one of the tubes 2 can pass there through, and has a parallelogram shape; i.e., a four-sided rectilinear figure with opposite sides parallel.

Figure 3:
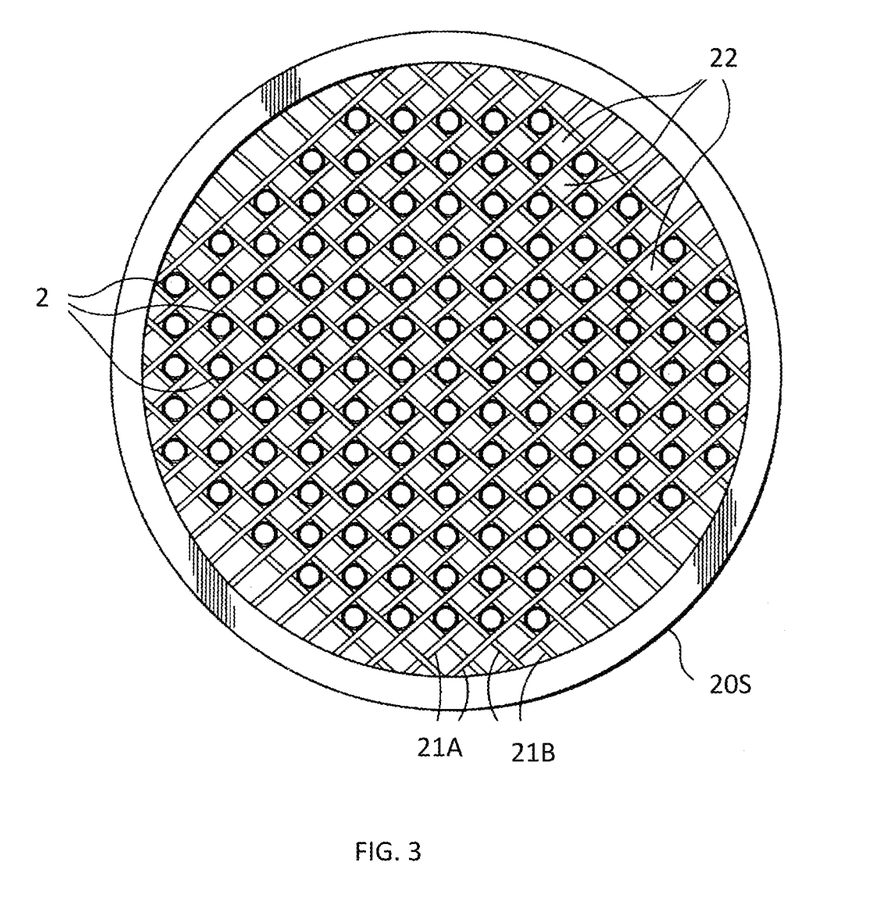
FIG. 3 is a top down view of the prior art baffle (i.e., tube support) depicted in FIGS. 2A-2B.

Referring now to FIG. 3, there is illustrated a top down view of the prior art baffle (i.e., tube support) shown in FIGS. 2A-2B which includes stainless steel straight strips 21A, 21B which sit into each other and form a grid pattern that contains tube openings 22; some of the tube openings 22 contain catalyst filled tubes 2. Each of the stainless steel straight strips 21A, 21B is affixed (welded) to an inner wall of a baffle support plate 20S. In some embodiments, particularly for EO reactors, the baffle support plate 20S is cylindrical in shape.

Figure 4A:
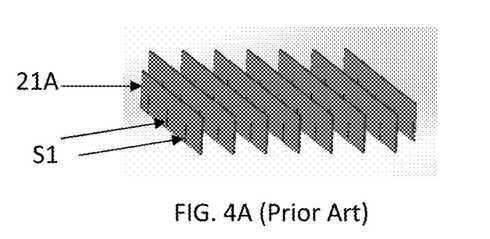
FIGS. 4A-4B are pictorial representations of various stainless steel straight strips that can be used in forming the prior art baffle (i.e., tube support) shown in FIG. 2B.
Figure 4B:
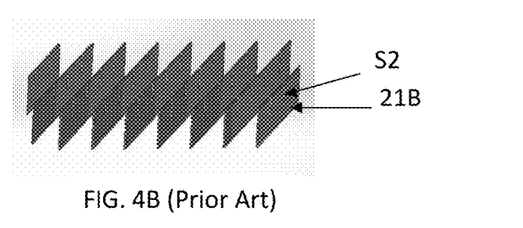
Figure 4C:
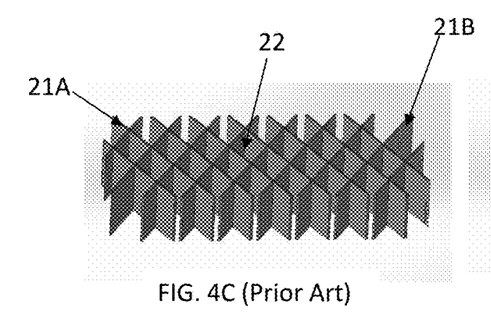
FIG. 4C is a pictorial representation after assembly of the stainless steel straight strips shown in FIGS. 4A-4B to provide the prior art baffle (i.e., tube support) having the grid pattern.
Figure 4D:
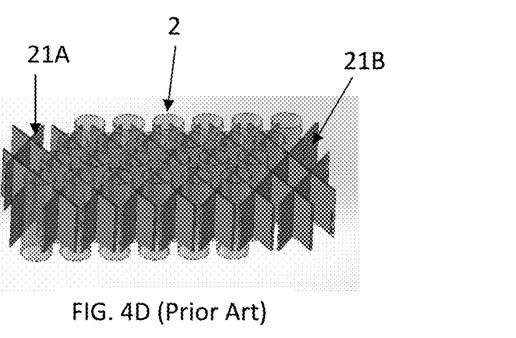
FIG. 4D is a pictorial representation of the assembled baffle (i.e., tube support) of FIG. 4C containing elongated tubes within the tubes openings.

FIGS. 4A-4D illustrate the prior art baffle 20 (i.e., tube support) shown in FIGS. 2A-2B during various stages of assembly. Notably, FIGS. 4A-4B illustrates various stainless steel straight strips 21A, 21B that can be used; these stainless steel straight strips 21A, 21B have straight edges along the entire length of the strip. In FIG. 4A, the stainless steel straight strips 21A have slits S1 located along a bottom surface of each of the stainless steel straight strips 21A. In FIG. 4B, the stainless steel straight strips 21B have slits S2 located along a top surface of each of the stainless steel straight strips 21B. FIG. 4C shows the baffle 20 after assembly of the stainless steel straight strips shown in FIGS. 4A-4B; while FIG. 4D shows the assembled baffle 20 (i.e., tube support) of FIG. 4C containing elongated tubes 2 within the tubes openings 22.

Fabrication of EO reactors containing baffles with the prior art design is getting very challenging due to the reactors' increasing size for larger plants, and costs are rising exponentially. One ongoing goal in EO reactor manufacturing is to reduce the size of the EO reactor taking advantage of reduced tube pitch; tube pitch is the shortest center-to-center distance between adjacent (i.e., neighboring) tubes. Reduced tube pitch cannot be obtained using the prior art baffle design illustrated in FIGS. 2A-2B, 3, and 4A-4D. As such, a new baffle design for EO reactors, and other shell-and-tube heat exchange reactors, is needed that can achieve reduced tube pitch.

SUMMARY

A baffle (i.e., tube support) for use in a shell-and-tube heat exchange reactor, such as, for example, an ethylene oxide (EO) reactor, is provided that accommodates reduced tube pitch, and thus more catalyst packed tubes can present in the reactor. The baffle, which can be referred to as a corrugated grid support, includes a plurality of corrugated stainless steel strips which sit into each other and form a grid pattern having tube openings. Each tube opening is configured to permit a catalyst packed tube to be inserted therein, while allowing a sufficient open area along the shell side of the tube to permit coolant to flow through the reactor.

In one aspect of the present invention, a shell-and-tube heat exchange reactor is provided that includes a plurality of elongated tubes in which an inlet end of each of the elongated tubes is affixed to an inlet tube sheet and the outlet end of each of the elongated tubes is affixed to an outlet tube sheet. The reactor further includes at least one baffle positioned between the inlet tube sheet and the outlet tube sheet and configured to support each of the elongated tubes. The at least one baffle of the present invention includes a plurality of corrugated stainless steel strips configured to form a grid pattern having tube openings. Each tube opening permits one of the elongated tubes to pass there through.

DETAILED DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present. The term "about" when used in conjugation with a numerical value denotes that the numerical value may fluctuate from ±10% from the given numerical value.

As stated above, the present invention provides a baffle (i.e., tube support) for use in a shell-and-tube heat exchange reactor, such as, for example, an ethylene oxide (EO) reactor as is shown in FIG. 1 above. The baffle of the present invention supports catalyst packed tubes present in the reactor against movement/vibration and diverts flow to increase heat transfer. Moreover, the baffle of the present invention is designed to accommodate reduced tube pitch (as compared to the prior art baffle design shown in FIGS. 2B, 3 and 4A-4D above), and thus more catalyst packed tubes can be present inside the reactor.

Figure 5:
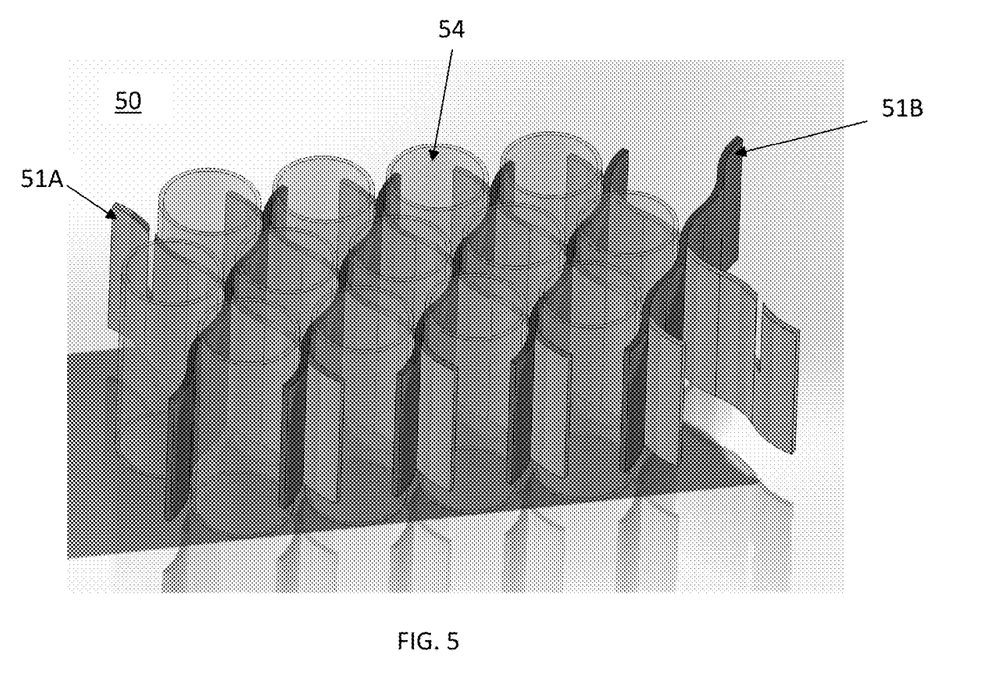
FIG. 5 is a pictorial representation of a baffle (i.e., tube support) in accordance with an embodiment of the present application, the baffle includes a plurality of corrugated stainless steel strips which sit into each other and form a grid pattern.

Referring now to FIG. 5, there is shown a portion of a baffle 50 in accordance with an embodiment of the present invention. The illustrated baffle 50 includes a plurality of corrugated stainless steel strips 51A, 51B which sit into each other and form a grid pattern having tube openings (not specifically labeled in FIG. 5, but labeled as element 52 in FIG. 6C). Each tube opening 52 has curved outer walls defined by the corrugated sidewall surfaces of the corrugated stainless steel strips 51A, 51B. Each tube opening 52 that is provided has a total area from about 550 mm$^2$ to about 5000 mm$^2$.

By "corrugated" it is meant, that the stainless steel strips 51A, 51B used in providing the baffle 50 of the present invention have a wavy (i.e., undulating, and thus not straight) sidewall surface that runs along an entire length of the strips 51A, 51B. Each tube opening 52 of the baffle 50 of the present invention is configured to permit an elongated tube 54 to be inserted therein, while allowing a sufficient open area (not labeled in FIG. 5) along the shell side of the tube 54 to permit coolant to flow through the reactor. The baffle 50 of the present invention is typically used in conjugated with other vertically spaced apart baffles having the same baffle design (i.e., baffles including a plurality of corrugated stainless steel strips 51A, 51B which sit into each other and form a grid pattern having tube openings). The elongated tubes 54 that can be employed in the present invention include a shell side and a tube side, and can have diameters that are well known to those skilled in the art. For example, and for a typical EO reactor, the elongated tubes 54 can have a diameter of from about 25 mm to about 70 mm.

The plurality of vertically spaced apart baffles having the baffle design shown in FIG. 5 are positioned between an inlet tube sheet (i.e., inlet tube sheet 3 shown in FIG. 1) and an outlet tube sheet (i.e., outlet tube sheet 6 shown in FIG. 1) of a shell-and-tube heat exchange reactor. Each of the corrugated stainless steel strips 51A, 51B of the plurality of corrugated stainless steel strips have first and second ends that are affixed, via welding or other affixing means, to an inner wall of a baffle support plate (such as baffle support plate 20S shown in FIG. 3); the baffle support plate is affixed to the inner wall of the reactor. The baffle support plate, which is used with the corrugated stainless steel strips 51A, 51B to provide a baffle in accordance with the present invention, can be cylindrical in shape.

Elongated tubes 54 (which are similar to tubes 2 shown in FIG. 1) are packed with a catalyst and have a first end affixed to the inlet tube sheet and a second end affixed to the outlet tube sheet of the shell-and-tube heat exchange reactor. Each baffle 50 is configured to support each of the elongated tubes 54. When a plurality of baffles 50 are employed, the plurality of baffles support the entire length of each of the elongated tubes 54.

Figure 6A:
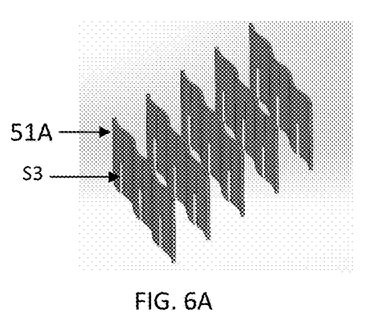
FIGS. 6A-6B are pictorial representations of various corrugated stainless steel strips that can be used in forming the baffle (i.e., tube support) shown in FIG. 5.
Figure 6B:
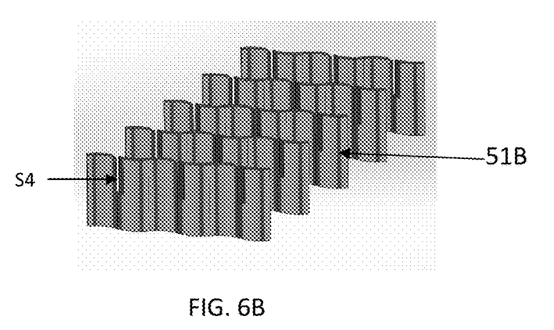
Figure 6C:
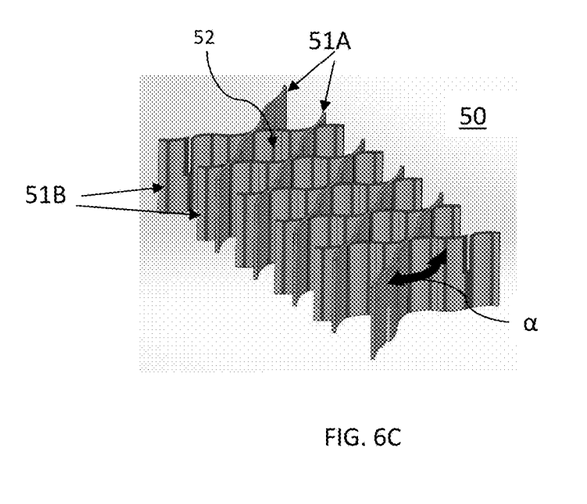
FIG. 6C is a pictorial representation after assembly of the corrugated stainless steel strips shown in FIGS. 6A-6B to provide the baffle (i.e., tube support) shown in FIG. 5.

The plurality of corrugated stainless steel strips 51A, 51B that provide each baffle 50 include a first set of corrugated stainless steel strips 51B oriented parallel to each other (see, FIG. 6B) and run in a first direction, and a second set of corrugated stainless steel strips 51A that are oriented parallel to each other (See FIG. 6A) and run in a second direction with is different from the first direction of the first set of corrugated stainless steel strips (See, FIG. 6C). Each of the first set of corrugated stainless steel strips 51B intersections each of the second set of corrugated stainless steel strips 51A to form a grid pattern. The angle, $\alpha$, between the first and second sets of corrugated stainless steel strips 51A, 51B can be configured based on the tube pattern. In one embodiment, and for EO reactors, the angle, $\alpha$, between the first and second sets of corrugated stainless steel strips 51A, 51B can be from 90° to 150°, with 120° being preferably. In other applications, the angle, $\alpha$, between the first and second sets of corrugated stainless steel strips 51A, 51B can be from 30° to 90°. Angle, $\alpha$, is shown in FIG. 6C. As is shown in FIG. 6B, each corrugated stainless steel strip 51B of the first set of corrugated stainless steel strips comprises slits S4 located along an upper surface thereof, and wherein each corrugated stainless steel strip 51A of the second set of corrugated stainless steel strips comprises slits S3 located along a bottom surface thereof. Slits (S3, S4) do not extend entirely through the respective corrugated stainless steel strip 51A, 51B. Each corrugated stainless steel strip 51A, 51B typically has a thickness from about 0.5 mm to about 5 mm. As is shown in FIG. 6C, the slits S3 on the second set of corrugated stainless steel strips 51A sit in the slits S4 of the first set of corrugated stainless strips 51B. The slits S3 and S4 are thus used to configure the plurality of corrugated stainless steel strips into the grip pattern shown in FIGS. 5 and 6.

Each baffle 50 of the present invention can be assembled by first providing a baffle support plate and then placing and affixing the first set of corrugated stainless steel strips 51B inside the baffle support plate. In the present invention, the placing and affixing of the first set of corrugated stainless steel strips 51B begins at the center of the baffle support plate and works outward therefrom. Next, the slits S3 of the second set of corrugated stainless steel strips 51A are seated into the slits S4 of the first set of corrugated stainless steel strips 51B (again started from the center and working outward). After the placing of the second set of corrugated stainless steel strips 51A, the second set of corrugated stainless steel strips 51A are affixed to the inner wall of the baffle support plate.

Figures 7A, 7B:
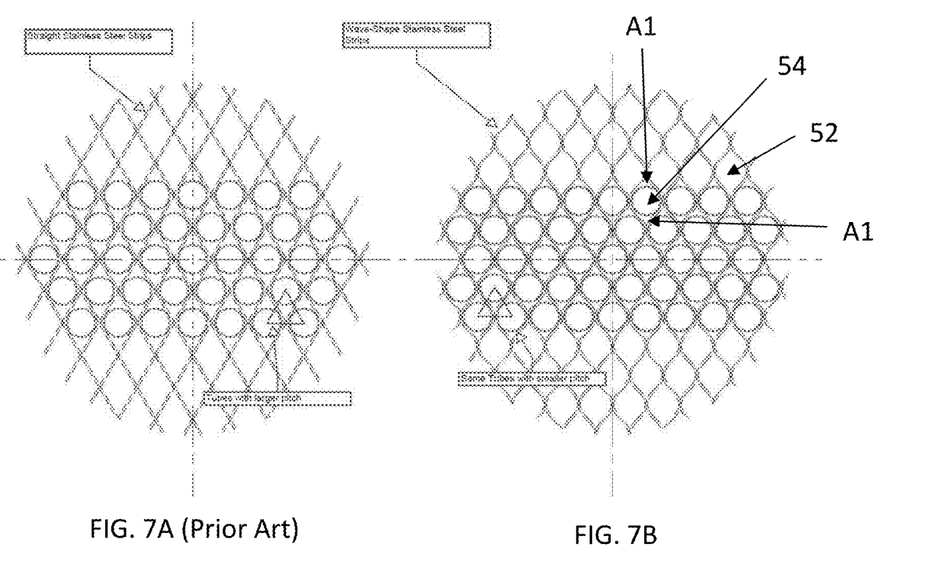
FIG. 7A is a top down view of the prior art baffle shown in FIG. 2B illustrating the tube pitch for such a baffle design.
FIG. 7B is a top down view of the baffle shown in FIG. 5 illustrating the tube pitch for such a baffle design.

For reactors with the same volume, the baffle design of the present invention accommodates reduced tube pitch (as compared to the prior art baffle design shown in FIGS. 2B, 3 and 4A-4D above), and thus more catalyst packed tubes can be present inside the reactor that contains the inventive baffle design. This is shown in FIGS. 7A and 7B of the present invention. Notably, FIG. 7A shows the tube pitch for the prior art baffle illustrated in FIG. 2B, while FIG. 7B shows the tube pitch for a baffle 50 including a plurality of corrugated stainless steel strips 51A, 51B which sit into each other and form a grid pattern having tube openings 52 for supporting an elongated tube 54 that is packed with a catalyst. By using the prior art baffle design, the pitch between each neighboring elongated tube is from about 30 mm to about 80 mm, while by using the baffle design of the present invention, the pitch between each neighboring elongated tube is from about 27 mm to about 70 m. The pitch between neighboring tubes (i.e., tube pitch) is a measurement from a center of one tube to the center of the other tube. This reduced tube pitch allows for a greater number of tubes to be present in the reactor (compared FIGS. 7A and 7B). In some instances, the baffle design on the present invention can lead to 7% to 14% more tubes to be present in reactor, as compared to an equivalent reactor including the prior art baffle design.

The baffle design of the present invention provides an open area A1 (see FIG. 7B) surrounding each of the elongated tubes 54, wherein the open area A1 is configured to permit a coolant to pass there through The open area A1 is located on the shell side of each of the tubes 54 and is contained within each individual tube opening provided by the corrugated stainless steel strips. In one embodiment, the open area has a total area from about 60 $mm^2$ to about 2000 $mm^2$.

The description that follows provides some details regarding the silver-based epoxidation catalyst that can be present inside an EO reactor containing a plurality of baffles (i.e., corrugated grid supports) in accordance with the present invention and some details regarding the EO operational conditions used during EO manufacturing. The description below is not meant to be exhaustive but provides a general description of both the silver-based epoxidation catalyst and EO operational conditions that can be used in the present invention.

Typical silver-based epoxidation catalysts include a support, and at least a catalytically effective amount of silver or a silver-containing compound; also optionally present is a promoting amount of rhenium or a rhenium-containing compound; also optionally present is a promoting amount of one or more alkali metals or alkali-metal-containing compounds. The support employed can be selected from a large number of solid, refractory supports that may be porous and may provide the preferred pore structure. Alumina is well known to be useful as a catalyst support for the epoxidation of an olefin and is a preferred support for silver-based epoxidation catalysts.

Regardless of the character of the support used, it is usually shaped into particles, chunks, pieces, pellets, rings, spheres, wagon wheels, cross-partitioned hollow cylinders, and the like, of a size suitable for employment in a fixed-bed epoxidation reactor. The support particles will preferably have equivalent diameters in the range from about 3 mm to about 12 mm, and more preferably in the range from about 5 mm to about 10 mm. (Equivalent diameter is the diameter of a sphere having the same external surface (i.e., neglecting surface within the pores of the particle) to volume ratio as the support particles being employed.) Suitable supports are available from Saint-Gobain Norpro Co., Sud Chemie AG, Noritake Co., CeramTec AG, and Industrie Bitossi S.p.A. Without being limited to the specific compositions and formulations contained therein, further information on support compositions and methods for making supports may be found in U.S. Patent Publication No. 2007/0037991.

In order to produce a catalyst for the oxidation of an olefin to an olefin oxide, a support having the above characteristics is then provided with a catalytically effective amount of silver on its surface. In one embodiment, the catalytic effective amount of silver is from 10% by weight to 45% by weight. The catalyst can be prepared by impregnating the support with a silver compound, complex or salt dissolved in a suitable solvent sufficient to cause deposition of a silver-precursor compound onto the support. Preferably, an aqueous silver solution can be used.

A promoting amount of a rhenium component, which may be a rhenium-containing compound or a rhenium-containing complex may also be deposited on the support, either prior to, coincidentally with, or subsequent to the deposition of the silver. The rhenium promoter may be present in an amount from about 0.001 wt. % to about 1 wt. %, preferably from about 0.005 wt. % to about 0.5 wt. %, and more preferably from about 0.01 wt. % to about 0.1 wt. % based on the weight of the total catalyst including the support, expressed as the rhenium metal.

Other components which may also be deposited on the support either prior to, coincidentally with, or subsequent to the deposition of the silver and rhenium are promoting amounts of an alkali metal or mixtures of two or more alkali metals, as well as optional promoting amounts of a Group IIA alkaline earth metal component or mixtures of two or more Group IIA alkaline earth metal components, and/or a transition metal component or mixtures of two or more transition metal components, all of which may be in the form of metal ions, metal compounds, metal complexes and/or metal salts dissolved in an appropriate solvent. The support may be impregnated at the same time or in separate steps with the various catalyst promoters. The particular combination of support, silver, alkali metal promoter(s), rhenium component, and optional additional promoter(s) of the instant invention will provide an improvement in one or more catalytic properties over the same combination of silver and support and none, or only one of the promoters.

As used herein the term "promoting amount" of a certain component of the catalyst refers to an amount of that component that works effectively to improve the catalytic performance of the catalyst when compared to a catalyst that does not contain that component. The exact concentrations employed, of course, will depend on, among other factors, the desired silver content, the nature of the support, the viscosity of the liquid, and solubility of the particular compound used to deliver the promoter into the impregnating solution. Examples of catalytic properties include, inter alia, operability (resistance to runaway), selectivity, activity, conversion, stability and yield. It is understood by one skilled in the art that one or more of the individual catalytic properties may be enhanced by the "promoting amount" while other catalytic properties may or may not be enhanced or may even be diminished.

Suitable alkali metal promoters may be selected from lithium, sodium, potassium, rubidium, cesium or combinations thereof, with cesium being preferred, and combinations of cesium with other alkali metals being especially preferred. The amount of alkali metal deposited or present on the support is to be a promoting amount. Preferably, the amount ranges from about 10 ppm to about 3000 ppm, more preferably from about 15 ppm to about 2000 ppm, and even more preferably from about 20 ppm to about 1500 ppm, and as especially preferred from about 50 ppm to about 1000 ppm by weight of the total catalyst, measured as the metal.

Suitable alkaline earth metal promoters comprise elements from Group IIA of the Periodic Table of the Elements, which may be beryllium, magnesium, calcium, strontium, and barium or combinations thereof. Suitable transition metal promoters may comprise elements from Groups IVA, VA, VIA, VIIA and VIIIA of the Periodic Table of the Elements, and combinations thereof.

The amount of alkaline earth metal promoter(s) and/or transition metal promoter(s) deposited on the support is a promoting amount. The transition metal promoter may typically be present in an amount from about 0.1 micromoles per gram to about 10 micromoles per gram, preferably from about 0.2 micromoles per gram to about 5 micromoles per gram.

The silver solution used to impregnate the support may also comprise an optional solvent or a complexing/solubilizing agent such as are known in the art. A wide variety of solvents or complexing/solubilizing agents may be employed to solubilize silver to the desired concentration in the impregnating medium. Useful complexing/solubilizing agents include amines, ammonia, oxalic acid, lactic acid and combinations thereof. Amines include an alkylene diamine having from 1 to 5 carbon atoms. In one preferred embodiment, the solution comprises an aqueous solution of silver oxalate and ethylene diamine. The complexing/solubilizing agent may be present in the impregnating solution in an amount from about 0.1 to about 5.0 moles per mole of silver, preferably from about 0.2 to about 4.0 moles, and more preferably from about 0.3 to about 3.0 moles for each mole of silver.

When a solvent is used, it may be an organic solvent or water, and may be polar or substantially or totally non-polar. In general, the solvent should have sufficient solvating power to solubilize the solution components. At the same time, it is preferred that the solvent be chosen to avoid having an undue influence on or interaction with the solvated promoters. Organic-based solvents which have 1 to about 8 carbon atoms per molecule are preferred. Mixtures of several organic solvents or mixtures of organic solvent(s) with water may be used, provided that such mixed solvents function as desired herein.

The concentration of silver in the impregnating solution is typically in the range from about 0.1% by weight up to the maximum solubility afforded by the particular solvent/solubilizing agent combination employed. It is generally very suitable to employ solutions containing from 0.5% to about 45% by weight of silver, with concentrations from 5 to 35% by weight of silver being preferred.

Impregnation of the selected support is achieved using any of the conventional methods; for example, excess solution impregnation, incipient wetness impregnation, spray coating, etc. Typically, the support material is placed in contact with the silver-containing solution until a sufficient amount of the solution is absorbed by the support. Preferably the quantity of the silver-containing solution used to impregnate the porous support is no more than is necessary to fill the pores of the support. A single impregnation or a series of impregnations, with or without intermediate drying, may be used, depending, in part, on the concentration of the silver component in the solution. Impregnation procedures are described, for example, in U.S. Pat. Nos. 4,761,394, 4,766,105, 4,908,343, 5,057,481, 5,187,140, 5,102,848, 5,011,807, 5,099,041 and 5,407,888. Known prior procedures of pre-deposition, co-deposition and post-deposition of various the promoters can be employed.

After impregnation of the support with the silver-containing compound, i.e., a silver precursor, optional rhenium component, an optional alkali metal component, and the optional other promoters, the impregnated support is calcined for a time sufficient to convert the silver containing compound to an active silver species and to remove the volatile components from the impregnated support to result in a catalyst precursor. The calcination may be accomplished by heating the impregnated support, preferably at a gradual rate, to a temperature in the range from about 200° C. to about 600° C. at a pressure in the range from about 0.5 to about 35 bar. In general, the higher the temperature, the shorter the required heating period. A wide range of heating periods have been suggested in the art; e.g., U.S. Pat. No. 3,563,914 discloses heating for less than 300 seconds, and U.S. Pat. No. 3,702,259 discloses heating from 2 to 8 hours at a temperature of from 100° C. to 375° C., usually for duration of from about 0.5 to about 8 hours. However, it is only important that the heating time be correlated with the temperature such that substantially all of the contained silver is converted to the active silver species. Continuous or step-wise heating may be used for this purpose.

During calcination, the impregnated support may be exposed to a gas atmosphere comprising an inert gas or a mixture of an inert gas with from about 10 ppm to 21% by volume of an oxygen-containing oxidizing component. For purposes of this invention, an inert gas is defined as a gas that does not substantially react with the catalyst or catalyst precursor under the conditions chosen for the calcination. Further information on catalyst manufacture may be found in the aforementioned U.S. Patent Publication No. 2007/0037991.

For purposes of illustration only, the following are conditions that are often used in current commercial EO reactor units: a gas hourly space velocity (GHSV) of 1500-10,000 $h^{-1}$, a reactor inlet pressure of 1 MPa to 3 MPa, a coolant temperature of 180-315° C., an oxygen conversion level of 10-60%, and an EO production rate (work rate) of 100-350 kg EO/m³ catalyst/hr and a change in ethylene oxide concentration, $\Delta EO$, of from about 1.5% to about 4.5%. The feed composition in the reactor inlet after the completion of start-up and during normal operation typically comprises (by volume %) 1-40% ethylene, 3-12% $O_2$; 0.2% to 10%, preferably 0.2% to 6%, more preferably 0.2% to 5% of $CO_2$; 0-5% ethane, an amount of one or more chloride moderators, which are described herein; and the balance of the feed being comprised of argon, methane, nitrogen or mixtures thereof.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A shell-and-tube heat exchange reactor comprising:
   a plurality of elongated tubes in which an inlet end of each of the elongated tubes is affixed to an inlet tube sheet and the outlet end of each of the elongated tubes is affixed to an outlet tube sheet; and
   at least one baffle positioned between the inlet tube sheet and the outlet tube sheet and configured to support each of the elongated tubes, wherein the at least one baffle comprises a plurality of corrugated stainless steel strips configured to form a grid pattern having tube openings, wherein each tube opening is spaced apart from an adjacent tube opening by a portion of one of the corrugated stainless steel strips and each tube opening permits one of the elongated tubes to pass there through, wherein the reactor is used in ethylene oxide (EO) production and each elongated tube is filled with a silver-based epoxidation catalyst.

2. The shell-and-tube heat exchange reactor of claim 1, wherein each of the corrugated stainless steel strips is affixed to a baffle support plate.

3. The shell-and-tube heat exchange reactor of claim 2, wherein the baffle support plate is cylindrical.

4. The shell-and-tube heat exchange reactor of claim 1, wherein a pitch between each neighboring elongated tube is from about 27 mm to about 70 mm.

5. The shell-and-tube heat exchange reactor of claim 1, wherein each tube opening has a total area from about 550 mm² to about 5000 mm².

6. The shell-and-tube heat exchange reactor of claim 1, wherein the plurality of corrugated stainless steel strips comprise a first set of corrugated stainless steel strips oriented parallel to each other and run in a first direction, and a second set of corrugated stainless steel strips that are oriented parallel to each other and run in a second direction that differs from the first direction of the first set of corrugated stainless steel strips.

7. The shell-and-tube heat exchange reactor of claim 6, wherein an angle, $\alpha$, between the first and second sets of corrugated stainless steel strips is from 90° to 150°.

8. The shell-and-tube heat exchange reactor of claim 6, wherein an angle, $\alpha$, between the first and second sets of corrugated stainless steel strips is from 30° to 90°.

9. The shell-and-tube heat exchange reactor of claim 6, wherein each corrugated stainless steel strip of the first set of corrugated stainless steel strips comprises slits located along an upper surface thereof, and wherein each corrugated stainless steel strip of the second set of corrugated stainless steel strips comprises slits located along a bottom surface thereof.

10. The shell-and-tube heat exchange reactor of claim 9, wherein the slits of the second set of corrugated stainless steel strips sit in the slits of the first set of corrugated stainless strips.

11. The shell-and-tube heat exchange reactor of claim 1, wherein each tube opening containing one of the elongated tubes further comprises an open area surrounding the elongated tube, wherein the open area is configured to permit a coolant to pass there through.

12. The shell-and-tube heat exchange reactor of claim 11, wherein the open area surrounding the elongated tube has a total area from about 60 mm² to about 2000 mm².

13. The shell-and-tube heat exchange reactor of claim 1, wherein the at least one baffle comprises a plurality of vertically spaced apart baffles supporting an entire length of each elongated tube, wherein each baffle of the plurality of vertically spaced apart baffles comprises a plurality of the corrugated stainless steel strips configured to form the grid pattern having the tube openings.

14. The shell-and-tube heat exchange reactor of claim 1, wherein the reactor further comprises an inlet line for introducing a feed gas comprising 1% to 40% ethylene and 3% to 12% oxygen into the reactor.

15. The shell-and-tube heat exchange reactor of claim 14, wherein the reactor is configured to operate at a gas hourly space velocity of 1500 to 10,000 $h^{-1}$, a reactor inlet pressure of 1 MPa to 3 MPa, a coolant temperature of 180° C. to 315° C., an oxygen conversion level of 10-60%, and an EO production rate (work rate) of 100-350 kg EO/$m^3$ catalyst/hr and a change in ethylene oxide concentration, $\Delta$EO, of from about 1.5% to about 4.5%.

16. The shell-and-tube heat exchange reactor of claim 1, wherein the silver-based epoxidation catalyst comprises an alumina support, a catalytically effective amount of silver or a silver-containing compound, and a promoting amount of one or more promoters.

17. The shell-and-tube heat exchange reactor of claim 16, wherein the one or more promoters comprises at least a rhenium promoter.

18. An ethylene oxide reactor (EO) comprising:
a plurality of elongated tubes in which an inlet end of each of the elongated tubes is affixed to an inlet tube sheet and the outlet end of each of the elongated tubes is affixed to an outlet tube sheet;
at least one baffle positioned between the inlet tube sheet and the outlet tube sheet and configured to support each of the elongated tubes, wherein the at least one baffle comprises a plurality of corrugated stainless steel strips configured to form a grid pattern having tube openings, wherein each tube opening permits one of the elongated tubes to pass there through; and
an inlet line for introducing a feed gas comprising 1% to 40% ethylene and 3% to 12% oxygen into the EO reactor, wherein the EO reactor is configured to operate at a gas hourly space velocity of 1500 to 10,000 $h^{-1}$, a reactor inlet pressure of 1 MPa to 3 MPa, a coolant temperature of 180° C. to 315° C., an oxygen conversion level of 10-60%, and an EO production rate (work rate) of 100-350 kg EO/$m^3$ catalyst/hr and a change in ethylene oxide concentration, $\Delta$EO, of from about 1.5% to about 4.5%, and wherein each elongated tube is filled with a silver-based epoxidation catalyst comprising an alumina support, a catalytically effective amount of silver or a silver-containing compound, and a promoting amount of one or more promoters.

* * * * *